(12) United States Patent
Chang et al.

(10) Patent No.: US 10,477,183 B2
(45) Date of Patent: Nov. 12, 2019

(54) METHOD AND APPARATUS OF CAMERA PARAMETER SIGNALING IN 3D VIDEO CODING

(71) Applicant: HFI Innovation Inc., Zhubei, Hsinchu County (TW)

(72) Inventors: Yu-Lin Chang, Taipei (TW); Yi-Wen Chen, Taichung (TW); Jian-Liang Lin, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 497 days.

(21) Appl. No.: 14/779,655

(22) PCT Filed: Jul. 18, 2014

(86) PCT No.: PCT/CN2014/082550
§ 371 (c)(1),
(2) Date: Sep. 24, 2015

(87) PCT Pub. No.: WO2015/007242
PCT Pub. Date: Jan. 22, 2015

(65) Prior Publication Data
US 2016/0057453 A1 Feb. 25, 2016

Related U.S. Application Data

(60) Provisional application No. 61/897,364, filed on Oct. 30, 2013, provisional application No. 61/891,201, (Continued)

(51) Int. Cl.
*H04N 13/172* (2018.01)
*H04N 13/178* (2018.01)
(Continued)

(52) U.S. Cl.
CPC .......... *H04N 13/172* (2018.05); *H04N 13/10* (2018.05); *H04N 13/178* (2018.05);
(Continued)

(58) Field of Classification Search
None
See application file for complete search history.

(56) References Cited

U.S. PATENT DOCUMENTS

2006/0023782 A1 2/2006 Cai et al.
2012/0076421 A1* 3/2012 Hadap ................. G06T 15/506
382/199

(Continued)

FOREIGN PATENT DOCUMENTS

CN 101166282 A 4/2008
CN 101309411 A 11/2008
(Continued)

OTHER PUBLICATIONS

H. Schwarz, C. Bartnik, S. Bosse, H. Brust, T. Hinz, H. Lakshman, D. Marpe, P. Merkle, K. Mueller, H. Rhee, G. Tech, M. Winken, & T. Wiegand, "3D Video Coding Using Advanced Prediction, Depth Modeling, and Encoder Control Methods", 2012 Picture Coding Symposium 1--4 (May 2012).*

(Continued)

*Primary Examiner* — Dave Czekaj
*Assistant Examiner* — David N Werner
(74) *Attorney, Agent, or Firm* — Oblon, McClelland, Maier & Neustadt, L.L.P.

(57) ABSTRACT

A method of three-dimensional video encoding and decoding that adaptively incorporates camera parameters in the video bitstream according to a control flag is disclosed. The control flag is derived based on a combination of individual control flags associated with multiple depth-oriented coding tools. Another control flag can be incorporated in the video (Continued)

bitstream to indicate whether there is a need for the camera parameters for the current layer. In another embodiment, a first flag and a second flag are used to adaptively control the presence and location of camera parameters for each layer or each view in the video bitstream. The first flag indicates whether camera parameters for each layer or view are present in the video bitstream. The second flag indicates camera parameter location for each layer or view in the video bitstream.

24 Claims, 8 Drawing Sheets

Related U.S. Application Data filed on Oct. 15, 2013, provisional application No. 61/890,366, filed on Oct. 14, 2013, provisional application No. 61/860,707, filed on Jul. 31, 2013, provisional application No. 61/859,797, filed on Jul. 30, 2013, provisional application No. 61/856,321, filed on Jul. 19, 2013.

(51) Int. Cl.
*H04N 13/10* (2018.01)
*H04N 19/46* (2014.01)
*H04N 19/597* (2014.01)
*H04N 19/176* (2014.01)
*H04N 19/187* (2014.01)
*H04N 19/513* (2014.01)
*H04N 19/30* (2014.01)

(52) U.S. Cl.
CPC ......... *H04N 19/176* (2014.11); *H04N 19/187* (2014.11); *H04N 19/46* (2014.11); *H04N 19/513* (2014.11); *H04N 19/597* (2014.11); *H04N 19/30* (2014.11)

(56) References Cited

U.S. PATENT DOCUMENTS

| | | | |
|---|---|---|---|
| 2012/0262547 A1 | 10/2012 | Lee | |
| 2012/0288208 A1* | 11/2012 | Katsumata | G11B 27/309 382/232 |
| 2012/0288257 A1* | 11/2012 | Katsumata | G11B 27/309 386/248 |
| 2013/0127987 A1 | 5/2013 | Zhang et al. | |
| 2014/0049603 A1* | 2/2014 | Wang | H04N 19/597 348/43 |
| 2014/0079116 A1* | 3/2014 | Wang | H04N 19/597 375/240.02 |
| 2014/0139626 A1* | 5/2014 | Suh | H04N 21/235 348/43 |
| 2014/0362181 A1* | 12/2014 | Suh | H04N 21/2362 348/43 |

FOREIGN PATENT DOCUMENTS

| | | |
|---|---|---|
| CN | 101610411 A | 12/2009 |
| CN | 102484727 A | 5/2012 |
| JP | 2011228929 A | 11/2011 |
| KR | 1020120131137 | 12/2012 |
| WO | 2013039333 A1 | 3/2013 |
| WO | 2013050184 A1 | 4/2013 |

OTHER PUBLICATIONS

Machine translation of WO 2013/039333 (Year: 2013).*
International Search Report dated Oct. 29, 2014, issued in application No. PCT/CN2014/082550.
Chang,. Y.L., et al.; "3D-HEVC HLS Camera parameter signaling and Depth reference selection;" Joint Collaborative Team on 3D Video Coding Extensions of ITU-T SG 16 WP 3 and ISO/IEC JTC 1/SC 29/WG 11; Apr. 2013; pp. 1-11.
Schwarz, H., et al.; "3D Video coding using advanced prediction;" 2012 Picture Coding Symposium; May 2012; pp. 1-4.

* cited by examiner

METHOD AND APPARATUS OF CAMERA PARAMETER SIGNALING IN 3D VIDEO CODING

CROSS REFERENCE TO RELATED APPLICATIONS

The present application is a national stage filing of PCT/CN2014/082550, filed Jul. 18, 2014, which PCT application claimed priority to the following provisional applications: U.S. Provisional Patent Application, Ser. No. 61/856,321, filed on Jul. 19, 2013, entitled "Camera Parameter Signaling for 3D video coding", U.S. Provisional Patent Application, Ser. No. 61/859,797, filed on Jul. 30, 2013, entitled "Adaptive Camera Parameter Signaling for 3D video coding", U.S. Provisional Patent Application, Ser. No. 61/860,707, filed on Jul. 31, 2013, entitled "Restriction for Camera Parameter Signaling of 3D Video Coding", U.S. Provisional Patent Application, Ser. No. 61/890,366, filed on Oct. 14, 2013, entitled "Constraints on Camera Parameter Signaling of 3D Video Coding", U.S. Provisional Patent Application, Ser. No. 61/891,201, filed on Oct. 15, 2013, entitled "Camera Parameter Signaling for 3D Video Coding", and U.S. Provisional Patent Application, Ser. No. 61/897,364, filed on Oct. 30, 2013, entitled "View Order Index based Camera Parameter Signaling for 3D Video Coding". The U.S. Provisional Patent Applications are hereby incorporated by reference in their entireties.

FIELD OF INVENTION

The present invention relates to three-dimensional video coding. In particular, the present invention relates to camera parameter signaling for three-dimensional (3D) coding tools in 3D video coding.

BACKGROUND OF THE INVENTION

Three-dimensional (3D) television has been a technology trend in recent years that intends to bring viewers sensational viewing experience. Various technologies have been developed to enable 3D viewing. Among them, the multi-view video is a key technology for 3D TV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, multi-view video coding exploits inter-view redundancy. Various 3D coding tools have been developed or being developed by extending existing video coding standard. For example, there are standard development activities to extend H.264/AVC (advanced video coding) and HEVC (high efficiency video coding) to multi-view video coding (MVC) and 3D coding.

Various 3D coding tools developed or being developed for 3D-HEVC and 3D-AVC are reviewed as follows.

To share the previously coded texture information of adjacent views, a technique known as Disparity-Compensated Prediction (DCP) has been included in 3D-HTM as an alternative coding tool to motion-compensated prediction (MCP). MCP refers to an inter-picture prediction that uses previously coded pictures of the same view, while DCP refers to an inter-picture prediction that uses previously coded pictures of other views in the same access unit. FIG. 1 illustrates an example of 3D video coding system incorporating MCP and DCP. The vector (110) used for DCP is termed as disparity vector (DV), which is analog to the motion vector (MV) used in MCP. FIG. 1 illustrates three MVs (120, 130 and 140) associated with MCP. Moreover, the DV of a DCP block can also be predicted by the disparity vector predictor (DVP) candidate derived from neighboring blocks or the temporal collocated blocks that also use inter-view reference pictures. In current 3D-HTM, when deriving an inter-view Merge candidate for Merge/Skip modes, if the motion information of corresponding block is not available or not valid, the inter-view Merge candidate is replaced by a DV.

Inter-view residual prediction is another coding tool used in 3D-HTM. To share the previously coded residual information of adjacent views, the residual signal of the current prediction block (i.e., PU) can be predicted by the residual signals of the corresponding blocks in the inter-view pictures as shown in FIG. 2. The corresponding blocks can be located by respective DVs. The video pictures and depth maps corresponding to a particular camera position are indicated by a view identifier (i.e., V0, V1 and V2 in FIG. 2). All video pictures and depth maps that belong to the same camera position are associated with the same viewIdx (i.e., view order index). The view order indices are used for specifying the coding order within the access units and detecting missing views in error-prone environments. An access unit includes all video pictures and depth maps corresponding to the same time instant. Inside an access unit, the video picture and, when present, the associated depth map having viewIdx equal to 0 are coded first, followed by the video picture and depth map having viewIdx equal to 1, etc. The view with viewIdx equal to 0 (i.e., V0 in FIG. 2) is also referred to as the base view or the independent view. The base view video pictures can be coded using a conventional HEVC video coder without dependence on other views.

As can be seen in FIG. 2, for the current block, motion vector predictor (MVP)/disparity vector predictor (DVP) can be derived from the inter-view blocks in the inter-view pictures. In the following, inter-view blocks in inter-view picture may be abbreviated as inter-view blocks. The derived candidate is termed as inter-view candidates, which can be inter-view MVPs or DVPs. The coding tools that codes the motion information of a current block (e.g., a current prediction unit, PU) based on previously coded motion information in other views is termed as inter-view motion parameter prediction. Furthermore, a corresponding block in a neighboring view is termed as an inter-view block and the inter-view block is located using the disparity vector derived from the depth information of current block in current picture.

The example shown in FIG. 2 corresponds to a view coding order from V0 (i.e., base view) to V1, and followed by V2. The current block in the current picture being coded is in V2. According to HTM3.1, all the MVs of reference blocks in the previously coded views can be considered as an inter-view candidate even if the inter-view pictures are not in the reference picture list of current picture. In FIG. 2, frames 210, 220 and 230 correspond to a video picture or a depth map from views V0, V1 and V2 at time t1 respectively. Block 232 is the current block in the current view, and blocks 212 and 222 are the collocated current blocks in V0 and V1 respectively. For the collocated current block 212 in V0, a disparity vector (216) is used to locate the inter-view collocated block (214). Similarly, for the collocated current block 222 in V1, a disparity vector (226) is used to locate the inter-view collocated block (224).

In a 3D system, the depth map in a reference view may be coded before texture pictures in dependent views. Therefore, the coded depth information becomes useful for subsequent texture and depth coding. For example, the processing order for texture and depth components may be T0, D0, T1, T2, D1 and D2 for a system having V0, V1 and V2, where "T" refers to texture and "D" refers to depth. The texture picture in the base view (i.e., V0) is coded first followed by the depth map in V0. For dependent views, the texture pictures are coded first followed by depth maps. Therefore, the coded depth map in view 0 can be used to derive the DV for the texture frame in view 1 to be coded. FIG. 3 illustrates an example of a technique of converting depth to disparity as used by virtual depth. A predicted disparity vector (340) is determined for the current block (CB, 310). An inter-view reference texture block (350) in the reference view is located from the collocated location (310') of the current block (CB, 310) by using the predicted disparity vector (340). The corresponding depth block (330) in the coded D0 collocated with the inter-view reference texture block (350) is retrieved for the current block (CB, 310). The retrieved block (330) is then used as the virtual depth block (330') for the current block to derive the DV. The depth values associated with the virtual depth block 330' is then used and converted to disparity. For example, the maximum value in the virtual depth block (330') can be used to convert into a disparity vector for various inter-view coding tools. In the current 3D-HEVC, the disparity vectors (DVs) used for disparity compensated prediction (DCP) are explicitly transmitted or implicitly derived in a way similar to motion vectors (MVs) with respect to AMVP (advanced motion vector prediction) and merging operations. Currently, except for the DV for DCP, the DVs used for the other coding tools are derived using either the neighboring block disparity vector (NBDV) process or the depth oriented neighboring block disparity (DoNBDV) process as described below.

In the current 3D-HEVC, a disparity vector can be used as a DVP candidate for Inter mode or as a Merge candidate for Merge/Skip mode. A derived disparity vector can also be used as an offset vector for inter-view motion prediction and inter-view residual prediction. When used as an offset vector, the DV is derived from spatial and temporal neighboring blocks as shown in FIG. 4. Multiple spatial and temporal neighboring blocks are determined and DV availability of the spatial and temporal neighboring blocks is checked according to a pre-determined order. This coding tool for DV derivation based on neighboring (spatial and temporal) blocks is termed as Neighboring Block DV (NBDV). As shown in FIG. 4A, the spatial neighboring block set includes the location diagonally across from the lower-left corner of the current block (i.e., A0), the location next to the left-bottom side of the current block (i.e., A1), the location diagonally across from the upper-left corner of the current block (i.e., B2), the location diagonally across from the upper-right corner of the current block (i.e., B0), and the location next to the top-right side of the current block (i.e., B1). As shown in FIG. 4B, the temporal neighboring block set includes the location at the center of the current block (i.e., BCTR) and the location diagonally across from the lower-right corner of the current block (i.e., RB) in a temporal reference picture. Instead of the center location, other locations (e.g., a lower-right block) within the current block in the temporal reference picture may also be used. In other words, any block collocated with the current block can be included in the temporal block set. Once a block is identified as having a DV, the checking process will be terminated. An exemplary search order for the spatial neighboring blocks in FIG. 4A is (A1, B1, B0, A0, B2). An exemplary search order for the temporal neighboring blocks for the temporal neighboring blocks in FIG. 4B is (BR, BCTR). In the current practice, two collocated pictures will be checked.

If a DCP coded block is not found in the neighboring block set (i.e., spatial and temporal neighboring blocks as shown in FIGS. 4A and 4B), the disparity information can be obtained from another coding tool, named DV-MCP. In this case, when a spatial neighboring block is MCP coded block and its motion is predicted by the inter-view motion prediction, as shown in FIG. 5, the disparity vector used for the inter-view motion prediction represents a motion correspondence between the current and the inter-view reference picture. This type of motion vector is referred to as inter-view predicted motion vector and the blocks are referred to as DV-MCP blocks. FIG. 5 illustrates an example of a DV-MCP block, where the motion information of the DV-MCP block (510) is predicted from a corresponding block (520) in the inter-view reference picture. The location of the corresponding block (520) is specified by a disparity vector (530). The disparity vector used in the DV-MCP block represents a motion correspondence between the current and inter-view reference picture. The motion information (522) of the corresponding block (520) is used to predict motion information (512) of the current block (510) in the current view.

To indicate whether a MCP block is DV-MCP coded and to store the disparity vector for the inter-view motion parameters prediction, two variables are used to represent the motion vector information for each block:

dvMcpFlag, and
dvMcpDisparity.

When dvMcpFlag is equal to 1, the dvMcpDisparity is set to indicate that the disparity vector is used for the inter-view motion parameter prediction. In the construction process for the AMVP mode and Merge candidate list, the dvMcpFlag of the candidate is set to 1 if the candidate is generated by inter-view motion parameter prediction and is set to 0 otherwise. If neither DCP coded blocks nor DV-MCP coded blocks are found in the above mentioned spatial and temporal neighboring blocks, then a zero vector can be used as a default disparity vector.

A method to enhance the NBDV by extracting a more accurate disparity vector (referred to as a refined DV in this disclosure) from the depth map is utilized in current 3D-HEVC. A depth block from coded depth map in the same access unit is first retrieved and used as a virtual depth of the current block. To be specific, the refined DV is converted from the maximum disparity of the pixel subset in the virtual depth block which is located by the DV derived using NBDV. This coding tool for DV derivation is termed as Depth-oriented NBDV (DoNBDV). Again, a zero vector could be used as a default DV if no refined DV could be derived by the DoNBDV. An estimated disparity vector can be extracted from the virtual depth shown in FIG. 5. The overall flow is as following:

1. Use an estimated disparity vector, which is the NBDV in current 3D-HTM, to locate the corresponding block in the coded texture view
2. Use the corresponding depth in the coded view for current block (coding unit) as virtual depth.
3. Extract a disparity vector (i.e., a refined DV) for inter-view motion prediction from the maximum value in the virtual depth retrieved in the previous step.

View synthesis prediction (VSP) is a technique to remove inter-view redundancies among video signal from different viewpoints, in which synthetic signal is used as references to predict a current picture. In 3D-HEVC test model, HTM-7.0, there exists a process to derive a disparity vector predictor, known as NBDV (Neighboring Block Disparity Vector). The derived disparity vector is then used to fetch a depth block in the depth image of the reference view. The procedure to derive the virtual depth as shown in FIG. 3 can be applied for VSP to locate the corresponding depth block in a coded view. The fetched depth block may have the same size of the current prediction unit (PU), and it will then be used to do backward warping for the current PU. In addition, the warping operation may be performed at a sub-PU level precision, such as 2×2 or 4×4 blocks as shown in FIG. 6.

In FIG. 6, a current texture block (610) in view 1 is to be processed. A predicted disparity vector (640) is used to locate an inter-view reference texture block 650 from the collocated location (610') of the current block. The collocated depth block (630) in the coded view corresponding to texture block 650 can be identified. The coded depth block (630) is then used as a virtual depth block (630') for the current block to perform backward warping. The current block (610) is divided into four sub-blocks. The virtual depth block is also divided into four sub-blocks. A maximum depth value may be selected for each sub-PU block to convert into a disparity vector for the sub-block. Therefore, 4 converted disparity vectors are obtained as shown as 4 arrows in FIG. 6. The four disparity vectors are used for backward warping all the pixels in the sub-PU blocks. The synthesized sub-blocks are then used for prediction of the current block. Currently a horizontal disparity vector is converted from the selected depth value. The backward VSP (BVSP) technique is applied to texture component coding.

In current implementation, BVSP is added as a new merging candidate to signal the use of BVSP prediction. In such a way, a BVSP block may be a skipped block without any residual, or a Merge block with residual information coded.

As described above, coding tools such as DoNBDV and VSP convert the depth values to one or more disparity vectors (DVs) for prediction. Such depth-oriented coding tools need the camera parameters for depth to disparity conversion. For example, the disparity value, D can be converted from the depth using a linear function of the depth value, d:

$$D = f \cdot l \cdot \left( \frac{d}{(2^{BitDepth} - 1)} \left( \frac{1}{Z_{near}} - \frac{1}{Z_{far}} \right) + \frac{1}{Z_{far}} \right). \quad (1)$$

The above conversion requires camera parameters Zfar, Znear, focal length f, and translation l, and data precision, BitDepth for the depth data. The above conversion can be simplified to:

$$D = (d * DisparityScale + DisparityOffset << BitDepth) + (1 << (\log 2 \, Div - 1))) >> \log 2 \, Div, \quad (2)$$

where DisparityScale is a scaling factor, DisparityOffset is an offset value, BitDepth is equal to 8 for typical depth data and log 2 Div is a shift parameter that depends on the required accuracy of the disparity vectors. The simplified conversion according to equation (2) uses arithmetic shifts instead of a division operation.

Following the wording of scalable video coding which codes a base layer with enhancement layers to improve the video scalability, the 3D video coding systems separate each texture/depth sequence in different views to each different "layer". Each layer has a layer identifier "LayerId". In HTM-7.0 (3D-HEVC based test Model version 7.0), the camera parameters are coded only when a layer is a non-depth layer. If only depth layers are coded or depth layers are coded before texture layers, the camera parameters will not be available for the depth oriented coding tools. Furthermore, in HTM-7.0, camera parameters are sent in the sequence parameter set (SPS) which only records the information of a single layer without knowing the relationship between different layers. The information to distinguish depth layers and non-depth layers is stored in VPS (video parameter set) when the depth flag VpsDepthhFlag is derived from dimension_id, which is only available in the VPS. The VpsDepthFlag[nuh_layer_id] specifies the depth flag of the layer with layer id as nuh_layer_id. Table 1 illustrates the syntax for camera parameters signaled in the SPS according to HTM-7.0. As shown in Table 1, cp_in_slice_header_flag controls whether camera parameters will be in the SPS extension or in slice segment header. If the cp_in_sliceheader_flag is 0, camera parameters (i.e., cp_scale[i], cp_off[i], cp_inv_scale_plus_scale[i] and cp_inv_off_plus_off[i] will be incorporated in the SPS extension. Otherwise, the camera parameters will be incorporated in the slice segment header. In HTM-7.0, redundancy in camera parameters exists between VPS (video parameter set) and slice segment header. Table 2 illustrates the syntax for camera parameters signaled in the slice header according to 3D HEVC Test Model 3. Also, redundancy in camera parameters exists between the texture and depth layers in the same view. It is desirable to develop techniques to resolve the issues of unavailable camera parameter and redundancy in camera parameters in some situations.

TABLE 1

| | Descriptor |
|---|---|
| sps_extension2( ) { | |
|   if( !VpsDepthFlag[ nuh_layer_id ] ) { | |
|     cp_precision | ue(v) |
|     cp_in_slice_header_flag | u(1) |
|     if( !cp_in_slice_header_flag) { | |
|       for ( i = 0; i < ViewId[ nuh_layer_id ]; i++ ) | |
|       { | |
|         cp_scale[ i ] | se(v) |
|         cp_off[ i ] | se(v) |
|         cp_inv_scale_plus_scale[ i ] | se(v) |
|         cp_inv_off_plus_off[ i ] | se(v) |
|       } | |
|     } | |
|   } | |
| } | |

TABLE 2

| | Descriptor |
|---|---|
| slice_header_extension( ) { | |
|     if( cp_in_slice_header_flag ) { | |
|         for ( i = 0; i < ViewIdx; i++ ) { | |
|             cp_scale[ i ] | se(v) |
|             cp_off[ i ] | se(v) |
|             cp_inv_scale_plus_scale[ i ] | se(v) |
|             cp_inv_off_plus_off[ i ] | se(v) |
|         } | |
|     } | |
| } | |

SUMMARY OF THE INVENTION

A method of three-dimensional video encoding and decoding that adaptively incorporates camera parameters in the video bitstream according to a control flag is disclosed. The control flag can be derived based on a combination of individual control flags associated with multiple depth-oriented coding tools. In this case, the control flag can be derived from the individual control flags using only OR operations, exclusive OR operations, AND operations, or other logic operations. The individual control flags associated with the multiple depth-oriented coding tools can be signaled in a sequence level, view level, picture level or slice level of the video bitstream. Alternatively, the control flag may also be signaled in the video bitstream.

Another control flag can be incorporated in the video bitstream to indicate whether there is a need for the camera parameters for the current layer, if the other control flag indicates a need for the camera parameters for the current layer, the value for the control flag is also set to indicate that the camera parameters are signaled for the current layer. In another embodiment, the control flag is derived based on a combination of another control flag and individual control flags. The other control flag is used to indicate a need to signal the camera parameters for the current layer, and the individual control flags are associated with multiple depth-oriented coding tools. In this case, the other control flag can be signaled in a sequence level, view level, picture level or slice level of the video bitstream. In yet another embodiment, the control flag is restricted by the depth-oriented coding tools, and the control flag is restricted to indicate that the camera parameters are signaled for the current layer if any of the depth-oriented coding tools is enabled.

The control flag can be derived based on the depth-oriented coding tools selected from a coding tool group, and the coding tool group comprises view synthesis prediction (VSP) and depth-oriented neighboring block disparity vector (DoNBDV). The control flag may also be derived based on the depth-oriented coding tools, and the depth-oriented coding tools convert depth values into disparity values using the camera parameters. The camera parameters in the video bitstream can be incorporated in a sequence level, view level, picture level or slice level of the video bitstream.

A method of three-dimensional video encoding and decoding that uses a first flag and a second flag to adaptively control the presence and location of camera parameters for each layer or each view in the video bitstream. The first flag indicates whether camera parameters for each layer or view are present in the video bitstream. The second flag indicates camera parameter location for each layer or view in the video bitstream. In one embodiment, the camera parameters are located in a slice segment header and the camera parameter location as of the slice segment header in the video bitstream is derived from a logic combination of the first flag and the second flag. Multiple second flags may be used to indicate multiple camera parameter locations in the video bitstream for each layer or view, and the multiple second flags can be derived from multiple first flags for each view. If the camera parameters are not present for a selected view, the first flags are inferred to be 0 for the selected view.

In another embodiment, the first flags, the second flags and the camera parameters for all layers are the same for a same view order index. If the camera parameters are signaled for a previous layer with the same view order index as a current layer, or the first flag indicates that the camera parameters are present for the previous layer with the same view order index as the current layer, then the first flag for the current layer is set to indicate that the camera parameters are not present for the current layer. In this case, the camera parameters for the current layer are inherited from the camera parameters of the previous layer with the same view order index.

DETAILED DESCRIPTION

Figure 1:
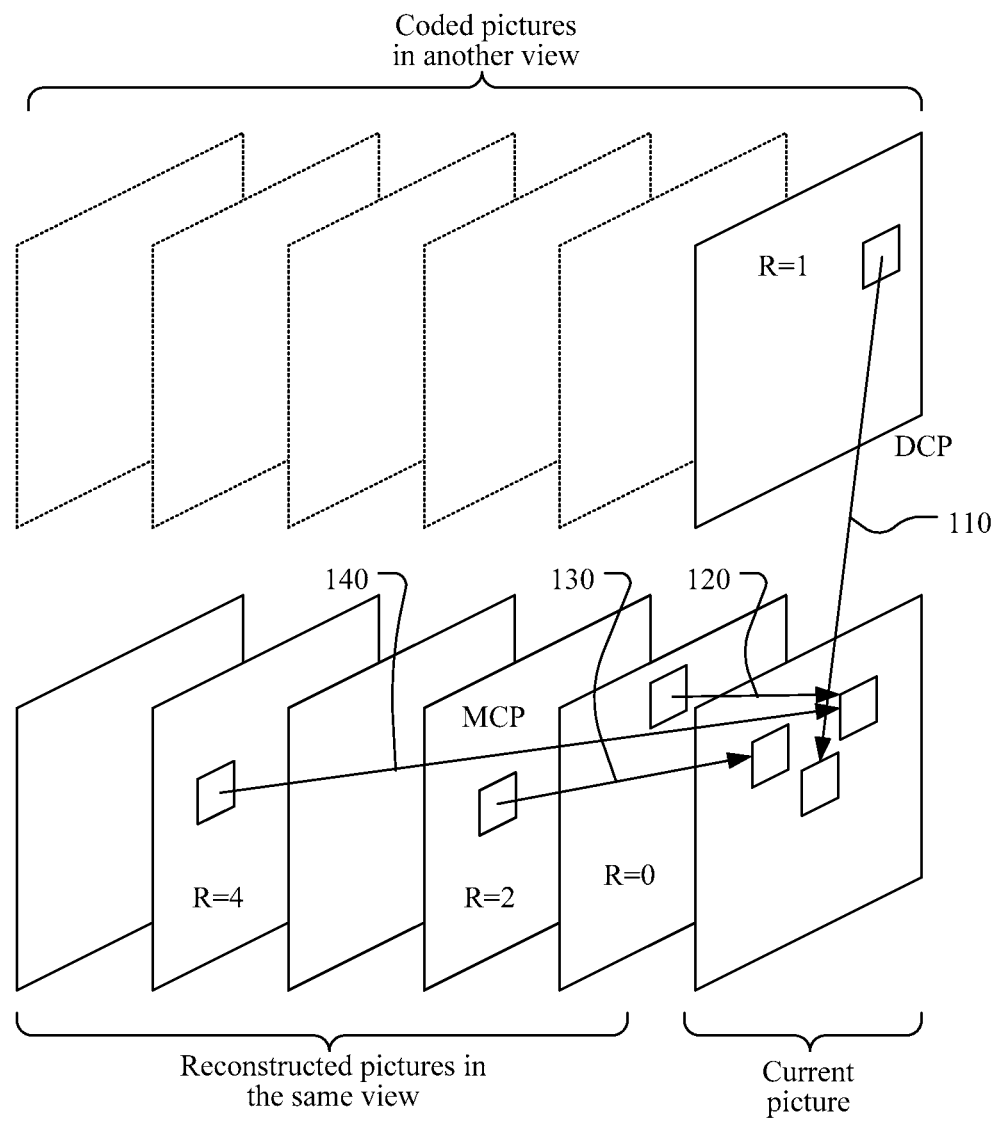
FIG. 1 illustrates an example of three-dimensional video coding incorporating disparity-compensated prediction (DCP) as an alternative to motion-compensated prediction (MCP).
Figure 2:
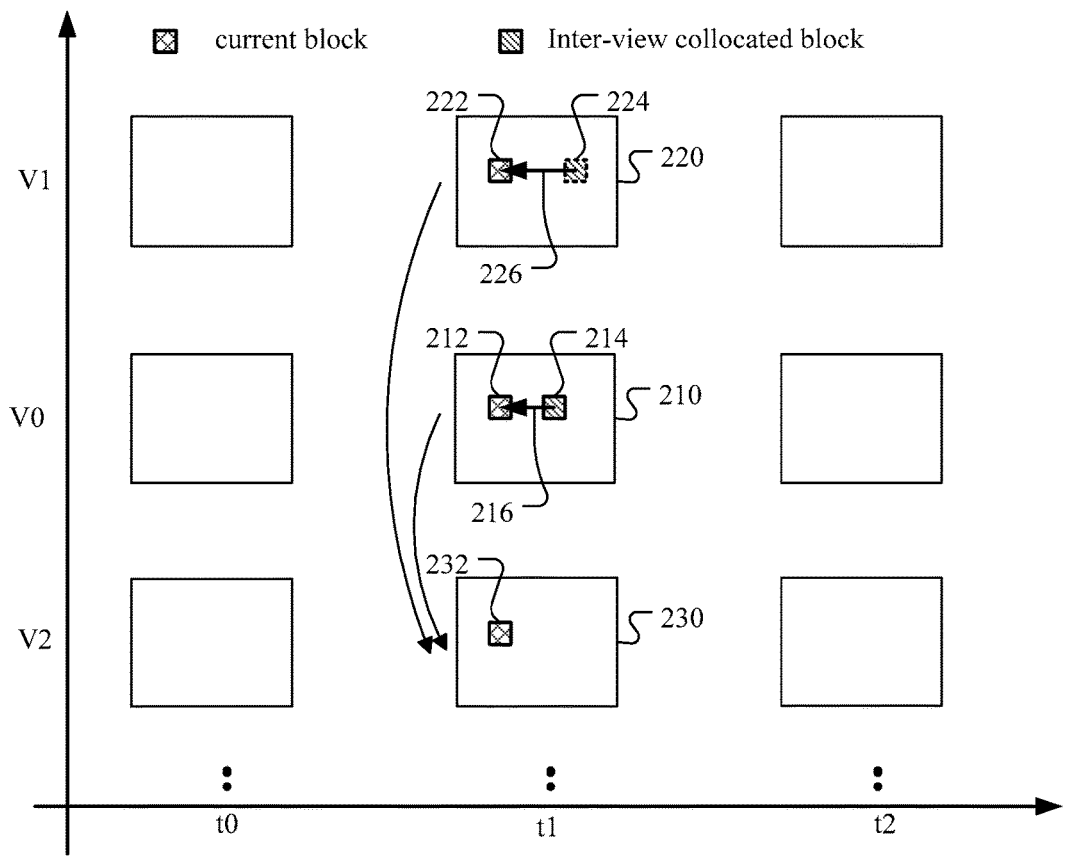
FIG. 2 illustrates an example of three-dimensional video coding utilizing previously coded information or residual information from adjacent views.
Figure 3:
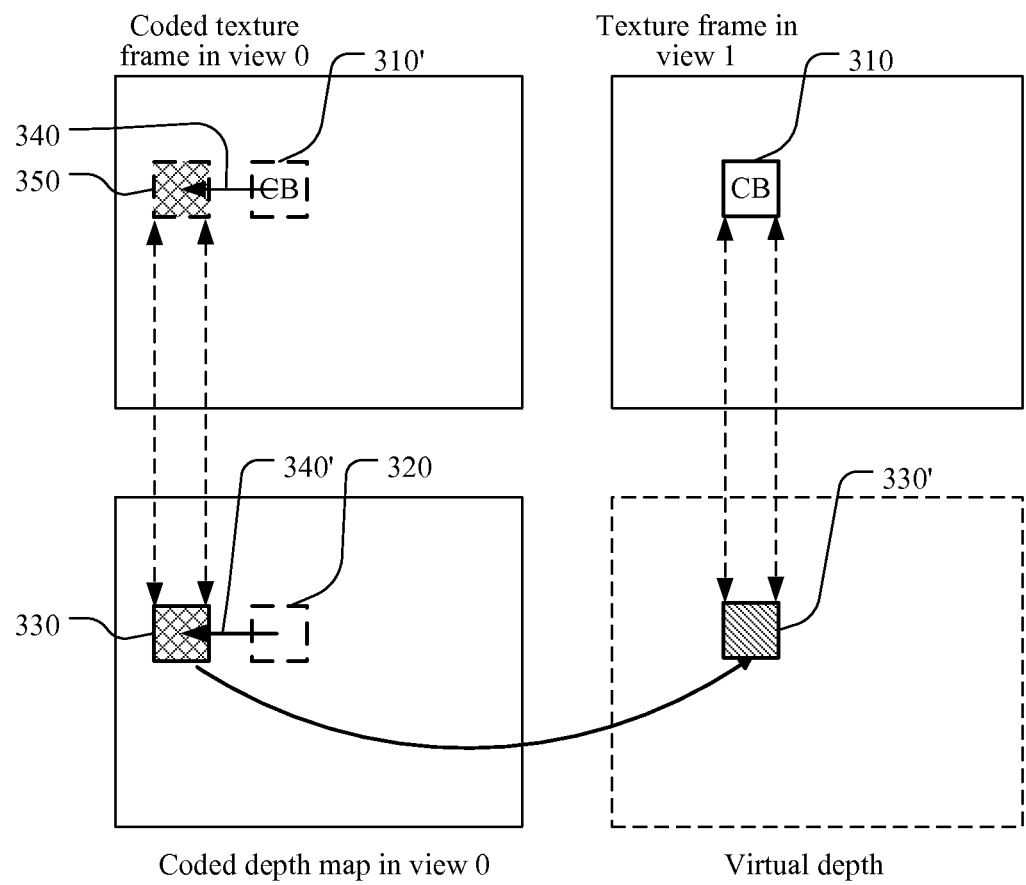
FIG. 3 illustrates an example of virtual depth derivation where the virtual depth is used for converting depth to disparity.
Figure 4A:
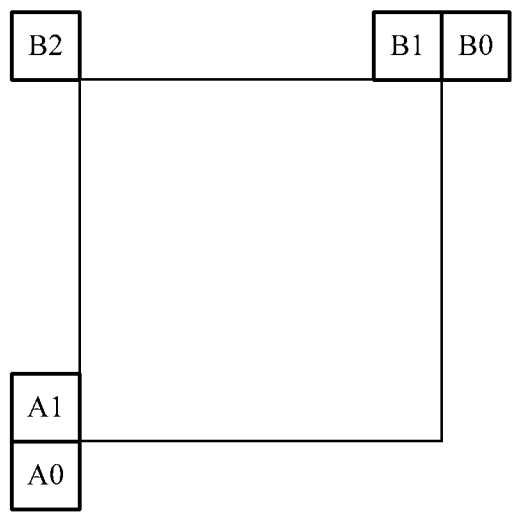
FIGS. 4A-B illustrate respective spatial neighboring blocks and temporal neighboring blocks of a current block for deriving a disparity vector for the current block in HTM-3.1.
Figure 4B:
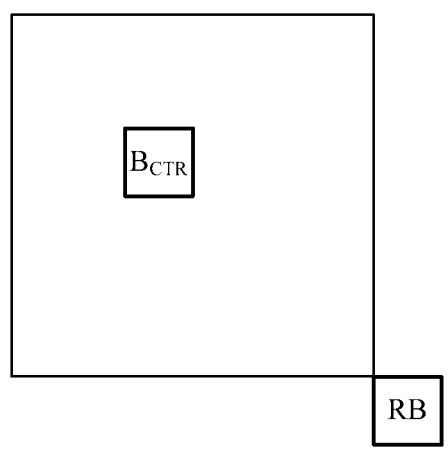
Figure 5:
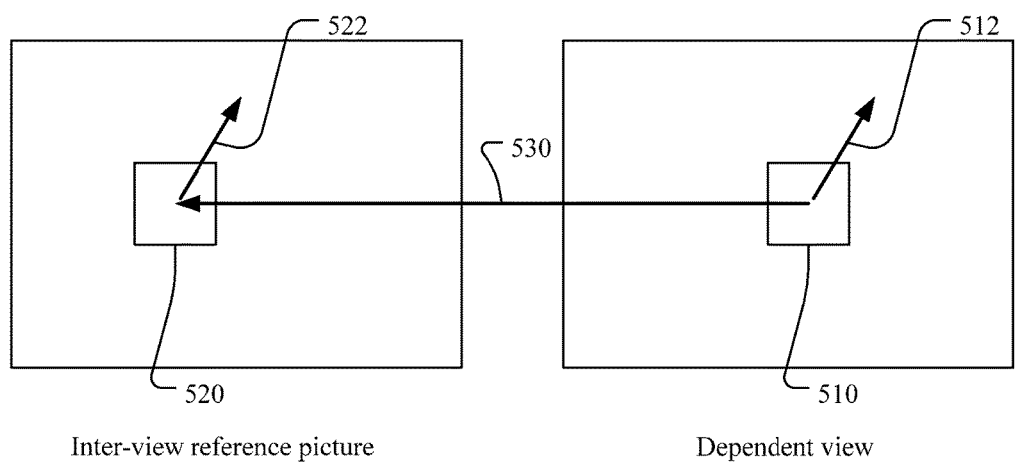
FIG. 5 illustrates an example of a disparity derivation from motion-compensated prediction (DV-MCP) block, where the location of the corresponding blocks is specified by a disparity vector.
Figure 6:
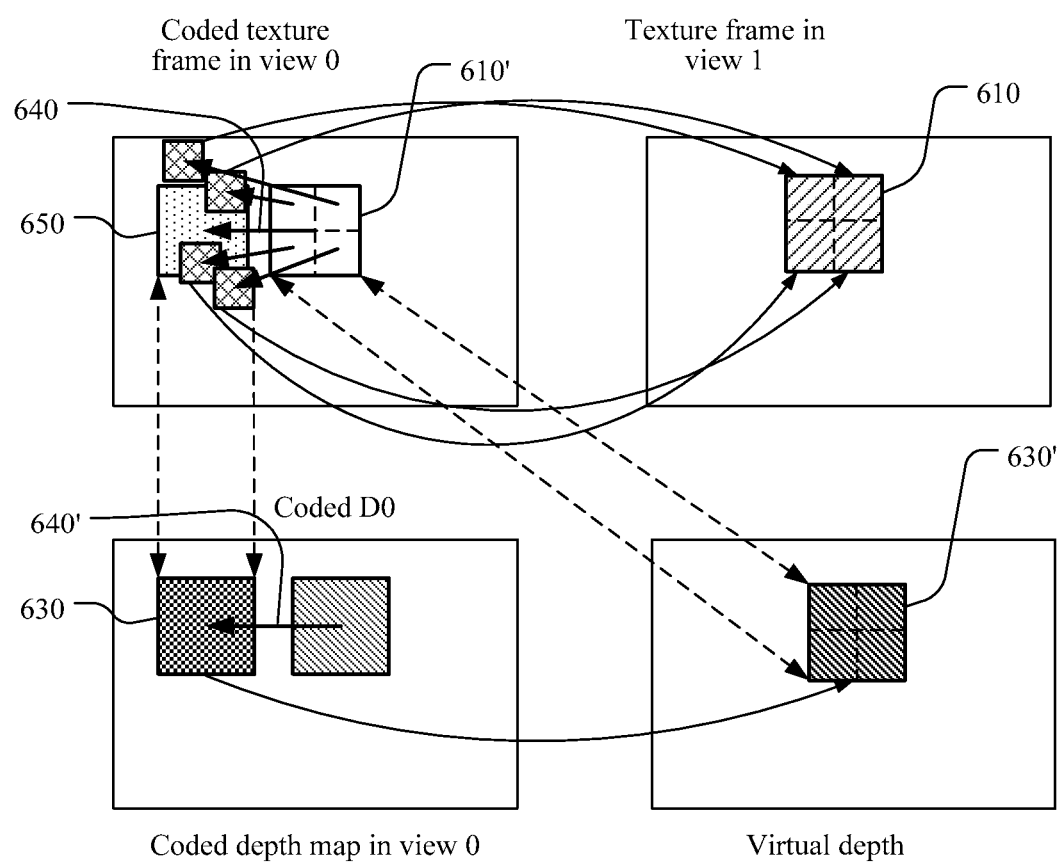
FIG. 6 illustrates an example of derivation process of backward view synthesis prediction (BVSP) that operates on sub-blocks.

As described above, Disparity Vector (DV) is critical in 3D video coding for both 3D-HEVC and 3D-AVC. For some 3D coding tools, the disparity vectors are derived from depth data. However, according to the conventional 3D coding standards, depth data may not be available when needed as mentioned above. For example, in HTM-7.0, the camera parameters are coded only when a layer is a non-depth layer. If only depth layers are coded or depth layers are coded before texture layers, the camera parameters will not be available for the depth oriented coding tools.

To overcome this problem, one embodiment of the present invention signals the camera parameters not only for non-depth layer but also for layers that utilize coding tools dependent on the depth for depth to disparity conversion. According to this embodiment, at least one flag needs to be derived or coded to indicate the use of the depth oriented coding tools, such as depth_refinement_flag or view_synthesis_flag in HTM 7.0. In the following syntax example in Table 3, "depth_oriented_tools_flag" is used to denote such a flag. The flag can be set to (depth_refinement_flag||view_synthesis_flag|| . . . ). The camera parameters are coded according to the depth_oriented_tools_flag. If the depth_oriented_tools_flag is on, the camera parameters are transmitted. A check mark "V" is placed at the end of the row to indicate the change from the conventional design and the change is highlighted by the text in bold and italic font style.

TABLE 3

| | Descriptor | |
|---|---|---|
| header_extension2( ) { | | |
|     if( !VpsDepthFlag[ nuh_layer_id ] \|\| | | V |
|     *depth_oriented_tools_flag* ) { | | |
|         cp_precision | ue(v) | |
|         cp_in_slice_header_flag | u(1) | |
|         if( !cp_in_slice_header_flag ) { | | |
|             for ( i = 0; i < ViewId[ nuh_layer_id ]; i++ ) { | | |
|                 cp_scale[ i ] | se(v) | |
|                 cp_off[ i ] | se(v) | |
|                 cp_inv_scale_plus_scale[ i ] | se(v) | |
|                 cp_inv_off_plus_off[ i ] | se(v) | |
|             } | | |
|         } | | |
|     } | | |
| } | | |

Another embodiment of the present invention uses a first flag to indicate whether the camera parameters are needed for a layer. If the first flag is equal to 1, it indicated that there is a need for sending the camera parameters for the indicated layer. Then a second flag is derived or coded to indicate whether the camera parameters are sent or not for the layer. For example, the first flag is designated as transmit_cp_flag and the second flag is designated as code_cp_flag. The syntax element code_cp_flag can be a combination of the transmit_cp_flag and several other flags. For example, the following equation shows that the code_cp_flag depends on the transmit_cp_flag and other flags that control whether the coding tools which need camera parameters are enabled or not.

$$\text{code\_cp\_flag[layerId]} = (\text{transmit\_cp\_flag[layerId]} || \text{depth\_refinement\_flag[layerId]} || \text{view\_synthesis\_pred\_flag[layerId]} || \text{other\_tool\_flag[layerId]} || \ldots). \quad (2)$$

An example of syntax design according to this embodiment is shown in Table 4, where the camera parameters are signaled for not only the non-depth layer but also the layers that utilize coding tools to convert disparity from depth. A check mark "V" is placed at the end of the rows to indicate the changes from the conventional design and the changes are highlighted by the text in bold and italic font style.

TABLE 4

| | Descriptor | |
|---|---|---|
| header_extension2( ) { | | |
| ... | | |
|     for( i = 0; i <= vps_max_layers_minus1; i++ ) { | | |
|         layerId = layer_id_in_nuh[ i ] | | |

TABLE 4-continued

| | Descriptor | |
|---|---|---|
|         view_id[ layerId ] | u(8) | |
|         if ( layerId ! = 0 ) { | | |
|             *transmit_cp_flag[ layerId ]* | u(1) | V |
|         } | | |
| .... | | |
| ... | | |
|     if( !cp_in_slice_header_flag ) | | |
|         for ( i = 0; i <= vps_max_layers_minus1; i++) | | |
|             if ( !VpsDepthFlag[ layer_id_in_nuh[ i ]] \|\| | | V |
|                 *code_cp_flag[ layer_id_in_nuh [ i ] ]* ) { | | |
|                 j = VpsViewIdx[ layer_id_in_nuh[ i ] ] | | |
|                 cp_scale[ j ] | se(v) | |
|                 cp_off[ j ] | se(v) | |
|                 cp_inv_scale_plus_scale[ j ] | se(v) | |
|                 cp_inv_off_plus_off[ j ] | se(v) | |
|         } | | |
| ... | | |
| } | | |

In the above syntax table, transmit_cp_flag[layerId] equal to 1 specifies that the camera parameters are necessary to be sent for the layer with nuh_layer_id equal to layerId. When not present, transmit_cp_flag[layerId] is inferred to be equal to 0.

In yet another embodiment, a flag is coded to specify the transmission of the camera parameters for a layer. If the flag is equal to 1, the camera parameters are sent for the indicated layer. However, a restriction is imposed on the flag to ensure that the system will operate properly. When the coding tools that require the camera parameters are turned on or enabled, the flag should be turned on as well to provide the camera parameters.

An example of syntax design according to this embodiment is shown in Table 5, where the camera parameters are sent not only for non-depth layer but also for layers utilizing coding tools that need to convert depth to disparity. When coding tools that require camera parameters are enabled, transmit_cp_flag[layered] should be coded with a value of 1. When not present, transmit_cp_flag[layerId] is inferred to be equal to 0. The example in Table illustrates the use of transmit_cp_flag[layered] to control whether to transmit the camera parameters in VPS. Similarly, a flag can be used to control whether to transmit the camera parameters in SPS (sequence parameter set) or the slice header. A check mark "V" is placed at the end of the rows to indicate the changes from the conventional design and the changes are highlighted by the text in bold and italic font style.

TABLE 5

| | Descriptor | |
|---|---|---|
| header_extension2( ) { | | |
| ... | | |
|     for( i = 0; i <= vps_max_layers_minus1; i++ ) { | | |
|         layerId = layer_id_in_nuh[ i ] | | |
|         view_id[ layerId ] | u(8) | |
|         if ( layerId ! = 0 ) { | | |
|             transmit_cp_flag[ layerId ] | u(1) | V |
|         } | | |
| .... | | |
| ... | | |
|     if( !cp_in_slice_header_flag ) | | |
|         for ( i = 0; i <= vps_max_layers_minus1; i++) | | |
|             if ( !VpsDepthFlag[ layer_id_in_nuh[ i ]] \|\| | | V |
|                 *transmit_cp_flag[ layer_id_in_nuh [ i ] ]* ) { | | |
|                 j = VpsViewIdx[ layer_id_in_nuh[ i ] ] | | |
|                 cp_scale[ j ] | se(v) | |
|                 cp_off[ j ] | se(v) | |

TABLE 5-continued

| | Descriptor |
|---|---|
| cp_inv_scale_plus_scale[ j ] | se(v) |
| cp_inv_off_plus_off[ j ] | se(v) |
| } | |
| ... | |
| } | |

In the syntax design according to 3D-HEVC Test Model version 8.0 (HTM-8.0), there is a redundancy issue with the camera parameters in the slice segment header. If the camera parameter present flag, cp_present_flag[layerId] equals to 1, the camera parameters are coded for such layer (i.e., layerId). If only depth layers are coded or depth layers are coded before texture layers, the depth oriented coding tools can function normally because of the constraint that the cp_present_flag shall be 1 if depth oriented coding tool is used. However, in HTM-8.0, the camera parameters in the slice segment header extension are coded according to cp_in_slice_segment_header_flag. In this case, even when cp_present_flag[layerId] equals to 0, the camera parameters may still be sent in the slice header extension for a certain layer.

In order to solve this redundancy issue, one embodiment of the present invention imposes a constraint on the slice header extension to prevent the conflict between cp_present_flag and cp_in_slice_segment_header_flag. An exemplary syntax design is shown in Table 6, where a condition check for cp_present_flag[nuh_layer_id] is added to further restrict the coding of the camera parameters. A check mark "V" is placed at the end of the row to indicate the change from the conventional design and the change is highlighted by the text in bold and italic font style.

TABLE 6

| | Descriptor | |
|---|---|---|
| slice_segment_header_extension( ) { | | |
|   if( cp_in_slice_segment_header_flag && | | V |
|       *cp_present_flag[nuh_layer_id ] ) {* | | |
|     for ( i = 0; i < ViewIdx; i++ ) { | | |
|       cp_scale[ i ] | se(v) | |
|       cp_off[ i ] | se(v) | |
|       cp_inv_scale_plus_scale[ i ] | se(v) | |
|       cp_inv_off_plus_off[ i ] | se(v) | |
|     } | | |
|   } | | |
| } | | |

In another embodiment, the cp_in_slice_segment_header_flag is changed to a flag array corresponding to each layer. If cp_present_flag[layerId] is turned on or enabled, the cp_in_slice_segment_header_flag[layerId] for the corresponding layer is coded. Otherwise, cp_in_slice_segment_header_flag[layerId] shall be inferred to be equal to 0. Two examples according to this embodiment are shown in Table 7 and Table 8 for controlling the camera parameters in VPS (video parameter set). The cp_in_slice_segment_header_flag[layerId] is modified to resolve the conflict between cp_present_flag and cp_in_slice_segment_header_flag. Table 9 illustrates another example according to this embodiment for controlling the camera parameters in the slice segment header extension. In these tables, a check mark "V" is placed at the end of the rows to indicate the changes from the conventional design, the new syntax elements are highlighted by the text in bold and italic font style, and the deleted syntax are enclosed by a pair of "//*" and "*//".

TABLE 7

| | Descriptor | |
|---|---|---|
| vps_extension2( ) { | | |
|   for( i = 0; i <= vps_max_layers_minus1; i++ ) { | | |
|     layerId = layer_id_in_nuh[ i ] | | |
|     if ( layerId != 0 ) { | | |
|       cp_present_flag[ layerId ] | | |
|       *if ( cp_present_flag[ layerId ] )* | | V |
|         *cp_in_slice_segment_header_flag[ layerId ]* | ue(v) | V |
| ... | | |
|   cp_precision | ue(v) | |
|   //*cp_in_slice_segment_header_flag*// | u(1) | V |
|   //*if( !cp_in_slice_segment_header_flag )// | | V |
|   for( i = 0; i <= vps_max_layers_minus1; i++ ) { | | |
|     layerId = layer_id_in_nuh[ i ] | | |
|     if( cp_present_flag[ layerId ] && | | V |
|       *!cp_in_slice_segment_header_flag[ layerId ] ) {* | | |
|       viewIdx = ViewOrderIdx[ layerId ] | | |
|       for( j = 0; j < viewIdx; j++ ) { | | |
|         vps_cp_scale[ viewIdx ][ j ] | se(v) | |
|         vps_cp_off[ viewIdx ][ j ] | se(v) | |
|         vps_cp_inv_scale_plus_scale[ viewIdx ][ j ] | se(v) | |
|         vps_cp_inv_off_plus_off[ viewIdx ][ j ] | se(v) | |
|       } | | |
|     } | | |
|   } | | |
|   iv_mv_scaling_flag | u(1) | |
| } | | |

TABLE 8

| | Descriptor | |
|---|---|---|
| vps_extension2( ) { | | |
|   for( i = 0; i <= vps_max_layers_minus1; i++ ) { | | |
|     layerId = layer_id_in_nuh[ i ] | | |
|     if ( layerId != 0 ) { | | |
|       cp_present_flag[ layerId ] | | |
|       *if ( cp_present_flag[ layerId ] ) {* | | V |
|         *cp_in_slice_segment_header_flag[ layerId ]* | ue(v) | V |
|         *if( !cp_in_slice_segment_header_flag[ layerId ]) {* | | V |
|           *for( i = 0; i <= vps_max_layers_minus1; i++ ) {* | | V |
|             *if( cp_present_flag[ layerId ] ) {* | | V |
|               *viewIdx = ViewOrderIdx[ layerId ]* | | V |
|               *for( j = 0; j < viewIdx; j++ ) {* | | V |
|                 *vps_cp_scale[ viewIdx ][ j ]* | se(v) | V |
|                 *vps_cp_off[ viewIdx ][ j ]* | se(v) | V |
|                 *vps_cp_inv_scale_plus_scale[ viewIdx ][ j ]* | se(v) | V |
|                 *vps_cp_inv_off_plus_off[ viewIdx ][ j ]* | se(v) | V |
|               } | | |
|             } | | |
|           } | | |
|         } | | |
|       } | | |
| ... | | |
|   cp_precision | ue(v) | |
|   //*cp_in_slice_segment_header_flag*// | u(1) | V |
|   //*if( !cp_in_slice_segment_header_flag ) *// | | V |
|     //*for( i = 0; i <= vps_max_layers_minus1; i++ ) *// | | V |
|       //*layerId = layer_id_in_nuh[ i ] *// | | V |
|       //*if( cp_present_flag[ layerId ] ) {*// | | V |
|         //viewIdx = ViewOrderIdx[ layerId ]// | | V |
|         //*for( j = 0; j < viewIdx; j++ ) { *// | | V |
|           //*vps_cp_scale[ viewIdx ][ j ] *// | se(v) | V |
|           //*vps_cp_off[ viewIdx ][ j ] *// | se(v) | V |
|           //*vps_cp_inv_scale_plus_scale[ viewIdx ][ j ] *// | se(v) | V |
|           //*vps_cp_inv_off_plus_off[ viewIdx ][ j ] *// | se(v) | V |
|         //*}*// | | V |
|     //*}*// | | V |
|   iv_mv_scaling_flag | u(1) | |
| } | | |

In Table 7 and Table 8, when cp_in_slice_segment_header_flag[layerId] equals to 1, it indicates that the syntax elements of vps_cp_scale[viewIdx][j], vps_cp_off[viewIdx][j], vps_cp_inv_scale_plus_scale[viewIdx][j], and vps_cp_inv_off_plus_off[viewIdx][j] are not present in the video parameter set. When cp_in_slice_segment_header_flag equals to 0, it indicates that the vps_cp_scale[viewIdx][j], vps_cp_off[viewIdx][j], vps_cp_inv_scale_plus_scale[viewIdx][j], and vps_cp_inv_off_plus_off[viewIdx][j] syntax elements are present in the slice segment header. When not present, the value of cp_in_slice_segment_header_flag[layerId] are inferred to be equal to 0.

TABLE 9

| | Descriptor |
|---|---|
| slice_segment_header_extension( ) { | |
|   if( cp_in_slice_segment_header_flag | V |
|     *nuh_layer_id ]* ) { | |
|       for ( i = 0; i < ViewIdx; i++ ) { | |
|         cp_scale[ i ] | se(v) |
|         cp_off[ i ] | se(v) |
|         cp_inv_scale_plus_scale[ i ] | se(v) |
|         cp_inv_off_plus_off[ i ] | se(v) |
|       } | |
|   } | |
| } | |

In 3D-HEVC, the camera parameters can be coded in video parameter set (VPS), slice segment header, or slice segment header extension. The camera parameters in VPS are signaled according to the cp_present_flag of each texture and depth layer. The camera parameters in the slice header are signaled according to cp_in_slice_segment_header_flag. The camera parameters of a layer with smaller layer index can be overwritten by the camera parameters of a layer with larger layer index if the two layers have the same view order index. Moreover, if the camera parameters in the slice segment header have to be signaled, they will be signaled in every layer including the layers in the base view. In these cases, the signaling of camera parameters in VPS and slice header may cause redundancy and ambiguity for the layers in the same view since the camera parameters should be consistent for each layer in the same view.

To overcome the problem of camera parameter overwriting between layers of the same view as mentioned above, an embodiment of the present invention signals the cp_present_flag and the camera parameters in the VPS according to the view order index. Since the camera parameters are related to different views, it is more reasonable to have the camera parameters signaled per view. An exemplary syntax design according to this embodiment is shown in Table 10, where a loop that iterates for all the view order indices is added, and the cp_present_flag and camera parameters are moved to the view order index loop. In this case, the camera parameters will not be overwritten between layers, and the camera parameters in the same view can be shared. In the table, a check mark "V" is placed at the end of the rows to indicate the changes from the conventional design, the new syntax elements are highlighted by the text in bold and italic font style, and the deleted syntax are enclosed by a pair of "//*" and "*//".

TABLE 10

| | Descriptor | |
|---|---|---|
| vps_extension2( ) { | | |
|     while( !byte_aligned( ) ) | | |
|         vps_extension_byte_alignment_reserved_one_bit | u(1) | |
|     for( i = 0; i <= vps_max_layers_minus1; i++ ) { | | |
|         layerId = layer_id_in_nuh[ i ] | | |
|         if ( layerId != 0 ) { | | |
|             //*cp_present_flag[ layerId ] *// | u(1) | V |
| ... | | |
|     } | | |
|     cp_precision | ue(v) | |
|     cp_in_slice_segment_header_flag | u(1) | |
|     if( !cp_in_slice_segment_header_flag ) | | |
|         for( //*i*// viewIdx = 0; //*i*// viewIdx <= *NumViews - 1* | | V |
|                 //*vps_max_layers_minus1*//; i++ ) | | |
|             //*layerId = layer_id_in_nuh[ i ]*// | | V |
|             *cp_present_flag[ viewIdx ]* | u(1) | V |
|             if( cp_present_flag[ //*layerId *//*viewIdx*] ) { | | V |
|                 //*viewIdx = ViewOrderIdx[ layerId ]*// | | V |
|                 for( j = 0; j < viewIdx; j++ ) { | | |
|                     vps_cp_scale[ viewIdx ][ j ] | se(v) | |
|                     vps_cp_off[ viewIdx ][ j ] | se(v) | |
|                     vps_cp_inv_scale_plus_scale[ viewIdx ][ j ] | se(v) | |
|                     vps_cp_inv_off_plus_off[ viewIdx ][ j ] | se(v) | |
|                 } | | |
|             } | | |
| ... | u(1) | |
| } | | |

In Table 10, when cp_present_flag[viewIdx] equals to 1, it indicates that vps_cp_scale[viewIdx][j], vps_cp_off [viewIdx][j], vps_cp_inv_scale_plus_scale[viewIdx][j], and vps_cp_inv_offplus_off[viewIdx][j], with j equal to Vps-ViewIdx[layerId], may be present for the layer with ViewIdx equal to viewIdx. When cp_present_flag[viewIdx] equals to 0, it indicates that vps_cp_scale[viewIdx][j], vps_cp_off [viewIdx][j], vps_cp_inv_scale_plus_scale[viewIdx][j], and vps_cp_inv_offplus_off[viewIdx][j], with j equal to Vps-ViewIdx[layerId], are not present. When VpsDepthFlag[layerId] equals to 1 and depth_refinement_flag[layerId] or view_synthesis_pred_flag[layerId] equals to 1, the value of cp_present_flag[VpsViewIdx[layerId] ] should be equal to 1. When not present, cp_present_flag[viewIdx] is inferred to be equal to 0.

When the coding tools which utilize camera parameters are enabled for a coding layer, the camera parameters for the specific view associated with this coding layer shall be signaled. In other words, cp_present_flag of the specific view shall be equal to 1. For example, in Table 10, when DoNBDV (i.e., depth_refinement_flag[layerId]) or VSP (i.e., view_synthesis_pred_flag[layerId]) is enabled for a texture layer (i.e., VpsDepthFlag[layerId]), the camera parameters for the view that the texture layer belongs to should be signaled (i.e., cp_present_flag[VpsViewIdx[layerId] ]=1). The checking of the coding tools which utilize camera parameters is not limited to checking the texture layers. The checking of the depth layer can also be included to determine the signaling of camera parameters.

Another embodiment of the present invention signals camera parameters in slice segment header without redundancy, where the camera parameters are signaled in slice segment header only on the condition that the view order index of the layer is not equal to 0 as shown in the exemplary syntax of Table 11. In this case, regardless whether the layer of the slice is a texture layer or a depth layer, the camera parameters are not signaled for the layers in the base view since the camera parameters in the base view are unnecessary. In the table, a check mark "V" is placed at the end of the rows to indicate the changes from the conventional design, the new syntax elements are highlighted by the text in bold and italic font style, and the deleted syntax are enclosed by a pair of "//*" and "*//".

TABLE 11

| | Descriptor | |
|---|---|---|
| slice_segment_header( ) { | | |
| ... | | |
|     if( ( weighted_pred_flag && slice_type = = P ) \|\| | | |
|         ( weighted_bipred_flag && slice_type = = B ) ) | | |
|         pred_weight_table( ) | | |
|     else if( layer_id && !MvHevcCompatibilityFlag ) { | | |
|         slice_ic_enable_flag | u(1) | |
|         if( slice_ic_enable_flag ) | | |
|             slice_ic_disable_merge_zero_idx_flag | u(1) | |
|     } | | |
|     five_minus_max_num_merge_cand | ue(v) | |
|     } | | |
|     if( *ViewOrderIndex[ layerId ] != 0* && | | V |
|         cp_in_slice_segment_header_flag ) { | | |
|         for ( i = 0; i < //*ViewIdx*//*ViewOrderIndex[ layerId ]*; | | V |

TABLE 11-continued

|  | Descriptor |
|---|---|
| i++ ) { | |
|     cp_scale[ i ] | se(v) |
|     cp_off[ i ] | se(v) |
|     cp_inv_scale_plus_scale[ i ] | se(v) |
|     cp_inv_off_plus_off[ i ] | se(v) |
|   } | |
| } | |
| slice_qp_delta | se(v) |
| if( pps_slice_chroma_qp_offsets_present_flag ) { | |
|     slice_cb_qp_offset | se(v) |
|     slice_cr_qp_offset | se(v) |
| } | |
| ... | |
| } | |
|   byte_alignment( ) | |
| } | |

In yet another embodiment of the present invention, a constraint is imposed on cp_present_flag, where if the cp_present_flag equals to 1 for a previous layer with the same view order index, then cp_present_flag[layerId] is set to 0 to prevent overwriting of the existing camera parameter. The camera parameters for the layer with layer index layerId are inherited from the previously coded camera parameters of a previous layer with the same view order index.

An exemplary syntax design according to this embodiment is shown in Table 12. When cp_present_flag for any precedent layer with the same view order index viewIdx equals to 1, the value of cp_present_flag[layerId] is set to 0. In the slice segment header extension shown in Table 13, a condition check for cp_present_flag[nuh_layer_id] is added to further constraint the coding of camera parameters with the same view order index. If the cp_in_slice_segment_header_flag is turned on in slice header extension, the camera parameters for the current layer with layer id nuh_layer_id are inherited from the previously coded camera parameter of other layers with the same view order index. In the table, a check mark "V" is placed at the end of the row to indicate the change from the conventional design and the new syntax elements are highlighted by the text in bold and italic font style.

In Table 12, when cp_present_flag[layerId] equals to 1, it indicates that VPS-level camera parameters such as vps_cp_scale[viewIdx][j], vps_cp_off[viewIdx][j], vps_cp_inv_scale_plus_scale[viewIdx][j], and vps_cp_inv_offplus_off[viewIdx][j], with j equal to VpsViewIdx[layerId], may be present for the layer with nuh_layer_id equal to layerId. When cp_present_flag[layerId] equals to 0, it indicates that vps_cp_scale[viewIdx][j], vps_cp_off[viewIdx][j], vps_cp_inv_scale_plus_scale[viewIdx][j], and vps_cp_inv_offplus_off[viewIdx][j], with j equal to VpsViewIdx[layerId], are not present. When VpsDepthFlag[layerId] equals to 1 and depth_refinement_flag[layerId] or view_synthesis_pred_flag[layerId] equals to 1, cp_present_flag[layerId] is set to 1. When not present, cp_present_flag[layerId] is inferred to be 0. When cp_present_flag for any precedent layer with the same view order index equals to 1, then cp_present_flag[layerId] is set to 0.

TABLE 13

|  | Descriptor |
|---|---|
| slice_segment_header_extension( ) { | |
|   if( cp_in_slice_segment_header_flag && | V |
|     *cp_present_flag[nuh_layer_id]* ) { | |
|     for ( i = 0; i < ViewIdx; i++ ) { | |
|       cp_scale[ i ] | se(v) |
|       cp_off[ i ] | se(v) |

TABLE 12

|  | Descriptor |  |
|---|---|---|
| VPS_header_extension2( ) { | | |
|   if ( layerId != 0 ) { | | |
|     *cp_present_flag* [ layerId ] | u(1) | V |
| ... | | |
| cp_precision | ue(v) | |
| cp_in_slice_segment_header_flag | u(1) | |
| if( !cp_in_slice_segment_header_flag ) | | |
|   for( i = 0; i <= vps_max_layers_minus1; i++ ) | | |
|     layerId = layer_id_in_nuh[ i ] | | |
|     if( cp_present_flag[ layerId ] ) { | | |
|       viewIdx = ViewOrderIdx[ layerId ] | | |
|       for( j = 0; j < viewIdx; j++ ) { | | |
|         vps_cp_scale[ viewIdx ][ j ] | se(v) | |
|         vps_cp_off[ viewIdx ][ j ] | se(v) | |
|         vps_cp_inv_scale_plus_scale[ viewIdx ][ j ] | se(v) | |
|         vps_cp_inv_off_plus_off[ viewIdx ][ j ] | se(v) | |
|       } | | |
|     } | | |

TABLE 13-continued

| | Descriptor |
|---|---|
|       cp_inv_scale_plus_scale[ i ] | se(v) |
|       cp_inv_off_plus_off[ i ] | se(v) |
|     } | |
|   } | |
|     } | |

In yet another embodiment of the present invention, a constraint is imposed on the syntax elements associated with the camera parameters such as cp_precision, cp_in_slice_segment_header_flag, vps_cp_scale[viewIdx][j], vps_cp_off[viewIdx][j], vps_cp_inv_scale_plus_scale [viewIdx][j], and vps_cp_inv_offplus_off[viewIdx][j]. For example, all the syntax elements associated with the camera parameters of the layers with the same view order index shall be the same.

The syntax element, cp_precision specifies the precision of vps_cp_scale[viewIdx][j], vps_cp_off [viewIdx][j], vps_cp_inv_scale_plus_scale [viewIdx][j], and vps_cp_inv_offplus_off[viewIdx][j] in the VPS and cp_scale[i], cp_off [i], cp_inv_scale_plus_scale[i], and cp_inv_offplus_off[i] in the slice segment header. The value of cp_precision can be set to the range of 0 to 5, inclusive.

When cp_in_slice_segment_header_flag equals to 1, it specifies that the syntax elements of vps_cp_scale[viewIdx] [j], vps_cp_off[viewIdx][j], vps_cp_inv_scale_plus_scale [viewIdx][j], and vps_cp_inv_off plus_off[viewIdx][j] are not present in the video parameter set. When camera_parameter_in_slice_header_flag equals to 0, it specifies that the vps_cp_scale[viewIdx][j], vps_cp_off[viewIdx][j], vps_cp_inv_scale_plus_scale[viewIdx][j], and vps_cp_inv_off plus_off[viewIdx][j] syntax elements are present in the slice segment header.

The syntax elements, vps_cp_scale[viewIdx][j], vps_cp_off[viewIdx][j], vps_cp_inv_scale_plus_scale [viewIdx][j], and vps_cpinv_off plus_off[viewIdx][j] specify conversion parameters for converting a depth value to a disparity value.

When present, the value of the VPS syntax elements cp_precision, cp_in_slice_segment_header_flag, vps_cp_scale[viewIdx][j], vps_cp_off[viewIdx][j], vps_cp_inv_scale_plus_scale[viewIdx][j], and vps_cp_inv_off plus_off [viewIdx][j] shall be the same in all layers of the same view order index.

In slice segment header extension, the value of the syntax elements cp_precision, cp_in_slice_segment_header_flag, vps_cp_scale[viewIdx][j], vps_cp_off[viewIdx][j], vps_cp_inv_scale_plus_scale[viewIdx][j], and vps_cp_inv_off plus_off[viewIdx][j] shall be the same in all layers of the same view order index.

Figure 7:
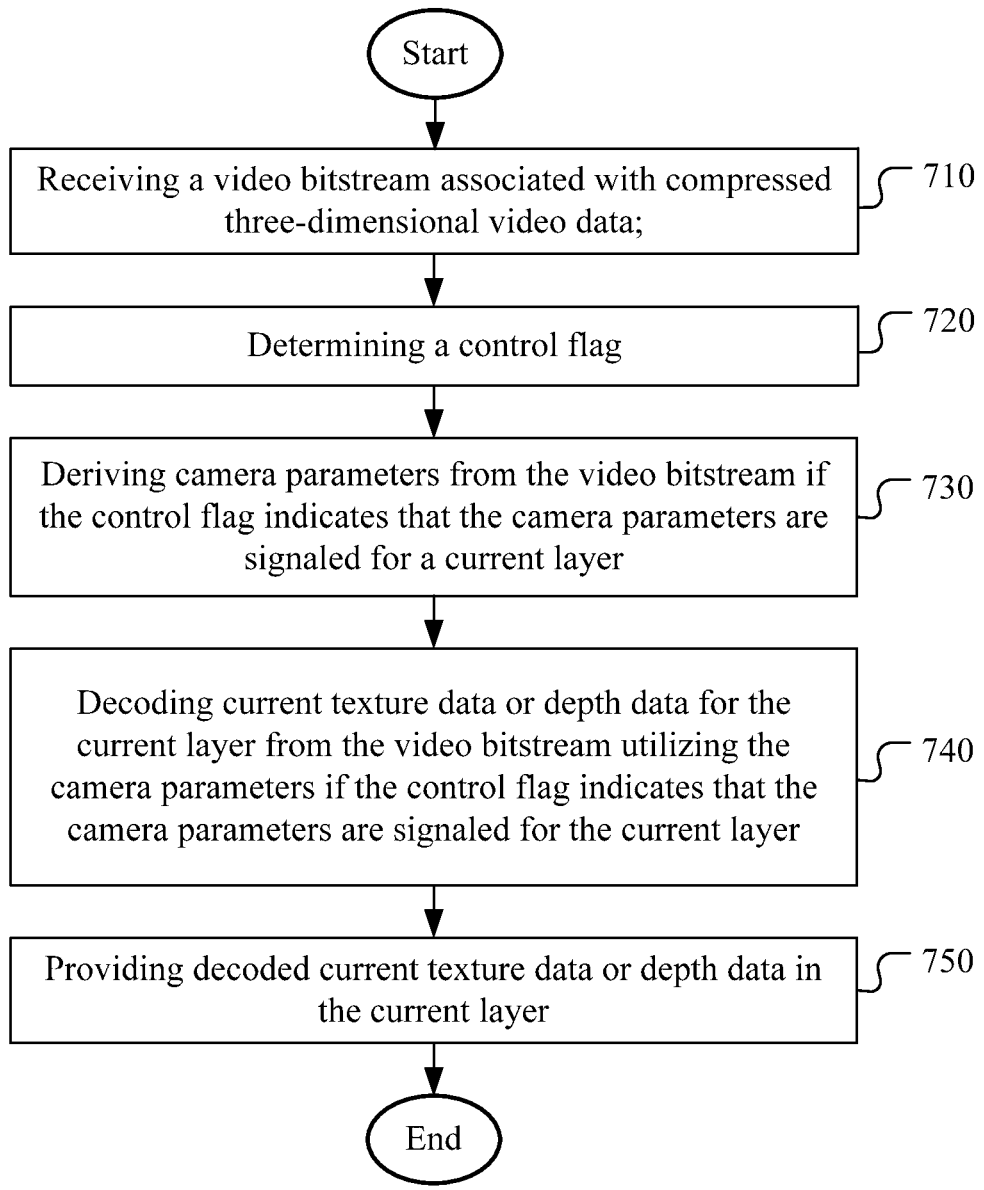
FIG. 7 illustrates an exemplary flowchart of three-dimensional video decoding that adaptively incorporates camera parameters in the video bitstream according to a control flag.

FIG. 7 illustrates an exemplary flowchart of three-dimensional video decoding that adaptively incorporates camera parameters in the video bitstream according to a control flag. The system receives a video bitstream associated with compressed three-dimensional video data as shown in step 710. The video bitstream may be retrieved from storage such as a computer memory, buffer (RAM or DRAM) or other media. The video bitstream may also be received from a processor such as a controller, a central processing unit, a digital signal processor or electronic circuits that produce the input data. A control flag is determined in step 720 and camera parameters are derived from the video bitstream if the control flag indicates that the camera parameters are signaled for a current layer in step 730. The current texture data or depth data for the current layer is decoded from the video bitstream utilizing the camera parameters if the control flag indicates that the camera parameters are signaled for the current layer in step 740. The decoded current texture data or depth data in the current layer is then outputted from the system as shown in step 750.

Figure 8:
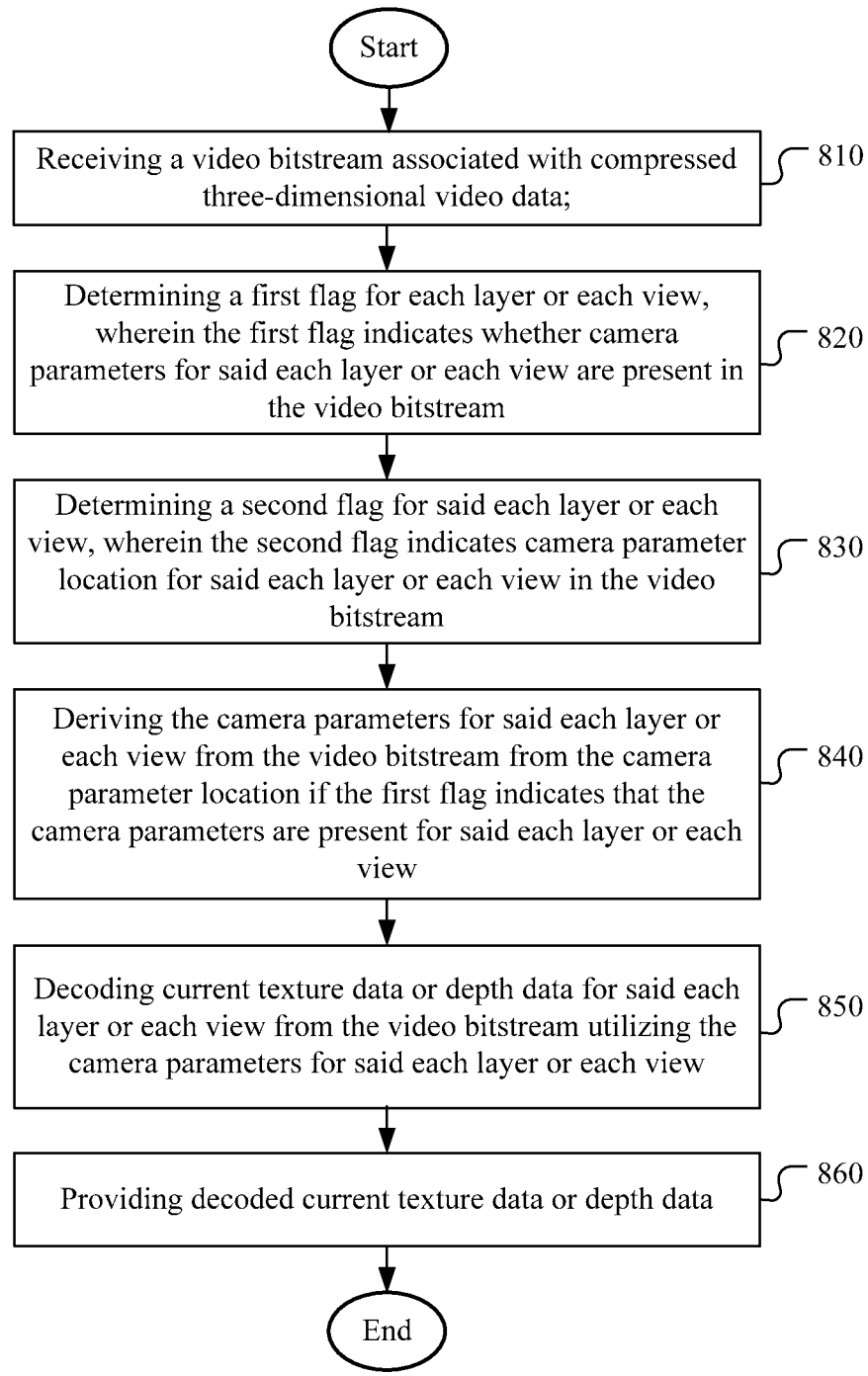
FIG. 8 illustrates an exemplary flowchart of three-dimensional video decoding that uses a first flag and a second flag to adaptively control the presence and location of camera parameters for each layer or each view in the video bitstream.

FIG. 8 illustrates an exemplary flowchart of three-dimensional video encoding and decoding that uses a first flag and a second flag to adaptively control the presence and location of camera parameters for each layer or each view in the video bitstream. The system receives a video bitstream associated with compressed three-dimensional video data as shown in step 810. A first flag for each layer or each view is determined in step 820, where the first flag indicates whether camera parameters for said each layer or each view are present in the video bitstream. A second flag for said each layer or each view is determined in step 830, where the second flag indicates camera parameter location for said each layer or each view in the video bitstream. The camera parameters for said each layer or each view from the video bitstream are derived from the camera parameter location if the first flag indicates that the camera parameters are present for said each layer or each view in step 840. The current texture data or depth data for said each layer or each view is decoded from the video bitstream utilizing the camera parameters for said each layer or each view in step 850. The decoded current texture data or depth data is then outputted from the system as shown in step 860.

The flowcharts shown above are intended to illustrate examples of adaptive camera parameter signaling in the bitstream. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of decoding three-dimensional video data for a video decoder, the method comprising:
   receiving a video bitstream associated with compressed three-dimensional video data;
   determining a control flag;
   deriving camera parameters from the video bitstream if the control flag indicates that the camera parameters are signaled for a current layer, wherein the camera parameters are related to different views and are signaled per view;
   decoding current texture data or depth data for the current layer from the video bitstream utilizing the camera parameters; and
   providing decoded current texture data or depth data in the current layer,
   wherein the control flag is derived based on:
   (i) a combination of individual control flags associated with multiple depth-oriented coding tools, wherein at least one of the multiple depth-oriented coding tools is configured to convert depth values into disparity values using the camera parameters; and
   (ii) one or more depth-oriented coding tools selected from a coding tool group, wherein the coding tool group comprises view synthesis prediction and depth-oriented neighboring block disparity vector, and
   wherein the individual control flags associated with said multiple depth-oriented coding tools are signaled in a view level, picture level, or slice level of the video bitstream.

2. The method of claim 1, wherein the control flag is derived from the individual control flags using one or more OR operations, exclusive OR operations, AND operations, or other logic operations.

3. The method of claim 1, wherein the control flag is signaled in the video bitstream.

4. The method of claim 1 further comprising determining another control flag indicating whether there is a need for the camera parameters for the current layer, wherein if said another control flag indicates the need to signal the camera parameters for the current layer, the control flag is set to indicate that the camera parameters are signaled for the current layer.

5. The method of claim 1, wherein said another control flag is signaled in a sequence level, the view level, the picture level or the slice level of the video bitstream.

6. The method of claim 1, wherein the control flag is restricted by said one or more depth-oriented coding tools, and wherein the control flag is restricted to indicate that the camera parameters are signaled for the current layer if any of said one or more depth-oriented coding tools is enabled.

7. The method of claim 6, wherein restriction information is used to indicate a selection that the control flag is restricted by said one or more depth-oriented coding tools, wherein the restriction information is implicitly derived or explicitly signaled in a sequence level, the view level, the picture level or the slice level of the video bitstream.

8. The method of claim 6, wherein restriction information is used to indicate a selection that the control flag is restricted by said one or more depth-oriented coding tools, wherein the restriction information is implicitly derived from a same syntax header layer or a lower syntax header layer regarding whether any of said one or more depth-oriented coding tools is enabled.

9. The method of claim 1, wherein the camera parameters in the video bitstream are incorporated in a sequence level, the view level, the picture level or the slice level of the video bitstream.

10. A method of encoding three-dimensional video data for a video encoder, the method comprising:
    receiving current texture data or depth data associated with a current layer in a dependent view;
    determining a control flag whether to incorporate camera parameters into a video bitstream for the current layer, wherein the camera parameters are related to different views and are signaled per view, wherein the control flag is derived based on:
    (i) a combination of another control flag and individual control flags; and
    (ii) one or more depth-oriented coding tools selected from a coding tool group, wherein the coding tool group comprises view synthesis prediction and depth-oriented neighboring block disparity vector,
    wherein said another control flag is used to indicate a need to signal the camera parameters for the current layer, and wherein said individual control flags are associated with multiple ones of the depth-oriented coding tools is configured to convert depth values into disparity values using the camera parameters, and
    wherein the individual control flags associated with said multiple ones of the depth-oriented coding tools are signaled in a view level, picture level, or slice level of the video bitstream;
    incorporating information associated with the camera parameters in the video bitstream if the control flag indicates that the camera parameters are signaled for the current layer;
    encoding the current texture data or depth data in the current layer utilizing the camera parameters to generate compressed data to incorporate into the video bitstream if the control flag indicates that the camera parameters are signaled for the current layer; and
    providing the video bitstream.

11. The method of claim 10, wherein the camera parameters in the video bitstream are incorporated in a sequence level, the view level, the picture level or the slice level of the video bitstream.

12. The method of claim 10, further comprising incorporating the control flag in the video bitstream.

13. The method of claim 10, further comprising incorporating said another control flag in a sequence level, the view level, the picture level or the slice level of the video bitstream.

14. The method of claim 10, further comprising incorporating restriction information in a sequence level, the view level, the picture level or the slice level of the video bitstream, wherein the restriction information is used to indicate a selection that the control flag is restricted by the one or more depth-oriented coding tools, and wherein the control flag is restricted to indicate that the camera parameters are signaled for the current layer if any of said one or more depth-oriented coding tools is enabled.

15. A method of decoding three-dimensional video data for a video decoder, the method comprising:
- receiving a video bitstream associated with compressed three-dimensional video data;
- determining a first flag for each layer or each view, wherein the first flag indicates whether camera parameters for said each layer or each view are present in the video bitstream;
- determining a second flag for each said layer or each view, wherein the second flag is derived from the first flag and indicates camera parameter location for said each layer or each view in the video bitstream, wherein the camera parameter location is derived from a logic combination of the first flag and the second flag;
- deriving the camera parameters for said each layer or each view from the video bitstream from the camera parameter location if the first flag indicates that the camera parameters are present for said each layer or each view;
- decoding current texture data or depth data for said each layer or each view from the video bitstream utilizing the camera parameters for said each layer or each view, wherein at least one of the first flag and the second flag is incorporated in a view level, picture level, or slice level of the video bitstream; and
- providing decoded current texture data or depth data.

16. The method of claim 15, wherein multiple second flags are used to indicate multiple camera parameter locations in the video bitstream for said each layer or each view.

17. The method of claim 16, wherein the multiple second flags are derived from multiple first flags for said each view.

18. The method of claim 17, wherein if the camera parameters are not present for a selected view, the first flags are inferred to be 0 for the selected view.

19. The method of claim 15, wherein the first flags, the second flags and the camera parameters for all layers are the same for a same view order index.

20. The method of claim 19, wherein if the camera parameters are signaled for a previous layer with the same view order index as a current layer, or the first flag indicates that the camera parameters are present for the previous layer with the same view order index as the current layer, the first flag for the current layer is set to indicate that the camera parameters are not present for the current layer.

21. The method of claim 20, wherein the camera parameters for the current layer are inherited from the camera parameters of the previous layer with the same view order index.

22. The method of claim 15, wherein the camera parameters are located in a slice segment header and wherein the camera parameter location as of the slice segment header in the video bitstream is derived based on a view order index or a logic combination of the view order index, layer index, the first flag, and the second flag.

23. The method of claim 22, wherein the camera parameter location as of the slice segment header in the video bitstream is based on a condition that the view order index is not equal to 0, or the layer index is not equal to 0 or 1.

24. A method of encoding three-dimensional video data for a video encoder, the method comprising:
- receiving current texture data or depth data associated with each layer or each view;
- incorporating a first flag for said each layer or each view of in a view bitstream, wherein a first language indicates whether camera parameters are present for said each layer or each view in the video bitstream;
- incorporating a second flag for said each layer or each view in the video bitstream, wherein the second flag is based on the first flag and indicates camera parameter location for said each layer or each view in the video bitstream, wherein the camera parameter location is derived from a logic combination of the first flag and the second flag;
- incorporating information associated with the camera parameters for said each layer or each view utilizing the camera parameters for said each layer or each view to generate compressed data to incorporate into the video bitstream,
wherein at least one of the first flag and the second flag is incorporated in a view level, picture level, or slice level of the video bitstream; and
providing the video bitstream.

* * * * *